(12) United States Patent
Lin et al.

(10) Patent No.: US 8,905,553 B2
(45) Date of Patent: Dec. 9, 2014

(54) LASER PROJECTOR AND METHOD OF DETECTING SCANNING ANGLE RANGE OF LASER BEAM THEREOF

(71) Applicant: Lite-On It Corporation, Taipei (TW)

(72) Inventors: Chia-Tse Lin, Hsinchu (TW); Kai-Wen Cheng, Hsinchu (TW)

(73) Assignee: Lite-On Technology Corporation, Taipei (TW)

( * ) Notice: Subject to any disclaimer, the term of this patent is extended or adjusted under 35 U.S.C. 154(b) by 200 days.

(21) Appl. No.: 13/746,311

(22) Filed: Jan. 22, 2013

(65) Prior Publication Data

US 2014/0168619 A1 Jun. 19, 2014

(30) Foreign Application Priority Data

Dec. 13, 2012 (CN) .......................... 2012 1 0538826

(51) Int. Cl.
*G03B 21/20* (2006.01)
*H04N 9/31* (2006.01)

(52) U.S. Cl.
CPC .......... *H04N 9/3129* (2013.01); *G03B 21/2033* (2013.01); *H04N 9/3161* (2013.01); *H04N 9/3191* (2013.01); *H04N 9/3194* (2013.01)
USPC .............. 353/85; 353/98; 353/99; 359/202.1; 359/212.1; 359/223.1; 359/225.1

(58) Field of Classification Search
CPC ........ G03B 21/00; G03B 21/14; G03B 21/20; G03B 21/2013; G03B 21/2033; G03B 21/206; G03B 21/28; H04N 9/31; H04N 9/3129; H04N 9/3132; H04N 9/3135; H04N 9/3161; H04N 9/3191; H04N 9/3194; G02B 26/10; G02B 26/101

USPC .................. 353/30–31, 37, 85, 94, 98–99; 359/196.1, 197.1, 201.1–201.2, 202.1, 359/203.1, 204.1–204.2, 205.1, 207.8, 359/212.1–212.2, 213.1, 214.1, 223.1, 359/225.1, 226.1

See application file for complete search history.

(56) References Cited

U.S. PATENT DOCUMENTS

| | | | |
|---|---|---|---|
| 5,085,506 A * | 2/1992 | Kahn et al. | 353/122 |
| 6,937,372 B2 | 8/2005 | Kandori et al. | |
| 7,239,436 B2 * | 7/2007 | Oettinger et al. | 359/213.1 |
| 7,262,894 B2 * | 8/2007 | Oettinger et al. | 359/213.1 |
| 7,468,508 B2 * | 12/2008 | DeLazari et al. | 250/235 |
| 7,583,417 B2 * | 9/2009 | Bush et al. | 358/474 |
| 7,898,713 B2 * | 3/2011 | Taniguchi | 359/213.1 |
| 7,990,596 B2 * | 8/2011 | Shimizu et al. | 359/199.1 |

(Continued)

*Primary Examiner* — Tony Ko
*Assistant Examiner* — Jori S Reilly-Diakun
(74) *Attorney, Agent, or Firm* — Jianq Chyun IP Office (57) ABSTRACT

A method of detecting a scanning angle range of a laser beam of a laser projector is provided. First, a photo sensor is disposed between first and second positions on a projection mirror. Then, a laser beam emitted from the laser projector scans back and forth between the first and second positions, so that the photo sensor receives the laser beam sequentially at first and second scanning time points to generate first and second sensing signals, respectively. If an actual time interval between the first and second sensing signals conforms to an expected time interval, an actual scanning angle range of the laser beam is determined as normal. If the actual time interval does not conform to the expected time interval, the actual scanning angle range of the laser beam is determined as abnormal and the laser projector stops emitting the laser beam. A laser projector is also provided.

12 Claims, 8 Drawing Sheets

(56) References Cited

U.S. PATENT DOCUMENTS

| | | | |
|---|---|---|---|
| 7,999,986 B2 * | 8/2011 | Shimizu et al. | 359/199.1 |
| 8,085,454 B2 * | 12/2011 | Shimizu et al. | 359/199.1 |
| 8,408,720 B2 * | 4/2013 | Nishigaki et al. | 353/94 |
| 8,636,367 B1 * | 1/2014 | Callison et al. | 353/98 |
| 8,643,923 B2 * | 2/2014 | Ishibashi | 359/199.1 |
| 2009/0116091 A1 * | 5/2009 | Overmann et al. | 359/212.1 |
| 2009/0316243 A1 * | 12/2009 | Tsuida | 359/202.1 |

* cited by examiner

LASER PROJECTOR AND METHOD OF DETECTING SCANNING ANGLE RANGE OF LASER BEAM THEREOF

CROSS-REFERENCE TO RELATED APPLICATION

This application claims the priority benefit of China application serial no. 201210538826.4, filed on Dec. 13, 2012. The entirety of the above-mentioned patent application is hereby incorporated by reference herein and made a part of this specification.

BACKGROUND

1. Field of the Invention

The present invention is directed to a projector and a method of detecting a scanning angle range of a light beam thereof and more particularly, to a laser projector and a method of detecting a scanning angle range of a laser beam thereof.

2. Description of Related Art

The micro-projection technology has been increasingly developed in recent years, and mainly has three types, which are a digital light processing (DLP) technology, a liquid crystal on silicone (LCOS) micro-projection technology and a micro-electro-mechanical systems (MEMS) laser scanning technology.

Taking a laser projector applying the MEMS laser scanning technology for example, a laser beam is reflected on a projection surface to produce a projection screen by a scanning operation of a scanning mirror. If the operation of the scanning mirror is controlled by the MEMS, the scanning operation may be incapable of being performed due to a functional abnormality or malfunction, which results in the scanning angle range of the scanning mirror and the laser beam being insufficient or incapable of performing the scanning operation. If the scanning angle range of the scanning mirror is insufficient, it represents areas projected by the laser projector becomes small and laser energy gathered per unit projected area becomes overly large, which causes damages to human eyes. Therefore, how to avoid damages to the users due to the abnormal scanning angle range of the laser beam from the laser projector has become a major subject of the design of the laser projector recently.

SUMMARY

The present invention is directed to a method of detecting a scanning angle range of a laser beam of a laser projector, by which damages to users due to an abnormal scanning angle range of the laser beam from the laser projector may be prevented.

The present invention is directed to a laser projector capable of preventing damages to users due to an abnormal scanning angle range of a laser beam from the laser projector.

The present invention is directed to a method of detecting a scanning angle range of a laser beam from a laser projector. First, a photo sensor is disposed on a projection mirror. The photo sensor is located between a first position and a second position on the projection mirror. Then, the laser projector is started up to enter a projection mode. A laser beam emitted from the laser projector in the projection mode performs scanning back and forth between the first position and the second position, such that the photo sensor receives the laser beam sequentially at a first scanning time point and at a second scanning time point to generate a first sensing signal and a second sensing signal, respectively. Afterward, an actual time interval between the first sensing signal and the second sensing signal is detected. If the actual time interval between the first sensing signal and the second sensing signal conforms to an expected time interval, the actual scanning angle range of the laser beam is determined as normal. If the actual time interval between the first sensing signal and the second sensing signal does not conform to the expected time interval, the actual scanning angle range of the laser beam is determined as abnormal, and the laser projector is controlled to stop emitting the laser beam.

In an embodiment of the present invention, the laser projector includes a laser source module and a scanning mirror. The step of performing scanning back and forth between the first position and the second position by the laser beam emitted from the laser projector includes the laser source module emitting the laser beam to the scanning mirror, the laser beam traveling toward the projection mirror through the scanning mirror, the scanning mirror swinging with a first axis or a second axis as a center to change a scanning direction of the laser beam, so that the laser beam performs scanning back and forth between the first position and the second position. The first axis is perpendicular to the second axis.

In an embodiment of the present invention, the method further includes measuring a size of the projection mirror to estimate an expected time interval.

In an embodiment of the present invention, the step of determining the actual scanning angle range of the laser beam as abnormal includes determining the actual scanning angle range of the laser beam as smaller than the expected scanning angle range if the actual time interval between the first sensing signal and the second sensing signal is smaller than the expected time interval, and determining the actual scanning angle range of the laser beam as greater than the expected scanning angle range if the actual time interval between the first sensing signal and the second sensing signal is greater than the expected time interval.

In an embodiment of the present invention, the method further includes starting up the laser projector to enter a first test mode before starting up the laser projector to enter the projection mode. In the first test mode, the laser beam performs scanning back and forth between the first position and the second position by a first driving signal, such that the photo sensor receives the laser beam sequentially at a first test time point and a second test time point to generate a first test signal and a second test signal, respectively. Meanwhile, the laser beam performs scanning back and forth between the first position and the second position by a second driving signal, such that the photo sensor receives the laser beam sequentially at a third test time point and at a fourth test time point to generate a third test signal and a fourth test signal, respectively. The first driving signal has a first frequency, and the second driving signal has a second frequency. Then, the first test signal, the second test signal, the third test signal and the fourth test signal are detected. The method also includes if either one of the actual time interval between the first test signal and the second test signal and the actual time interval between the third test signal and the fourth test signal conforms to the expected time interval, starting the laser projector to enter the projection mode by using the first driving signal or the second driving signal that conforms to the expected time interval.

In an embodiment of the present invention, the method further includes if both the actual time interval between the first test signal and the second test signal and the actual time interval between the third test signal and the fourth test signal do not conform to the expected time interval, and the actual time interval between the first test signal and the second test signal is greater than the actual time interval between the third test signal and the fourth test signal, starting up the laser projector to enter a second test mode. In the second test mode, the laser beam performs scanning back and forth between the first position and the second position by using a third driving signal, such that the photo sensor receives the laser beam sequentially at a fifth test time point and at a sixth test time point to generate a fifth test signal and a sixth test signal, respectively. Meanwhile, the laser beam performs scanning back and forth between the first position and the second position by a using fourth driving signal in the second test mode, such that the photo sensor receives the laser beam sequentially at a seventh test time point and an eighth test time point to generate a seventh test signal and an eighth test signal, respectively. The third driving signal has a third frequency, and the fourth driving signal has a fourth frequency. The third frequency equals to the first frequency plus an increment, and the fourth frequency equals to the first frequency minus a decrement. Then, the fifth test signal, the sixth test signal, the seventh test signal and the eighth test signal are detected. The method also includes if either one of the actual time interval between the fifth test signal and the sixth test signal and the actual time interval between the seventh test signal and the eighth test signal conforms to the expected time interval, starting up the laser projector to enter the projection mode by using the third driving signal or the fourth driving signal that conforms to the expected time interval.

In an embodiment of the present invention, the expected time interval is a range value with a tolerable difference.

The present invention is directed to a laser projector including a projection lens, a photo sensor and a detection unit. The projection lens has a projection mirror. The photo sensor is disposed on a projection mirror and located between a first position and a second position on the projection mirror. A laser beam is emitted from the laser projector in a projection mode and performs scanning back and forth between the first position and the second position. The photo sensor receives the laser beam sequentially at a first scanning time point and a second scanning time point to generate a first sensing signal and a second sensing signal, respectively. The detection unit is configured to detect the first sensing signal and the second sensing signal. When an actual time interval between the first sensing signal and the second sensing signal does not conform to an expected time interval, the laser projector stops emitting the laser beam.

In an embodiment of the present invention, the laser projector includes a laser source module and the scanning mirror. The laser source module is configured to emit the laser beam to the scanning mirror. The laser beam travels toward the projection mirror through the scanning mirror. The scanning mirror swings with a first axis or a second axis as a center to change a scanning direction of the laser beam, such that the laser beam performs scanning back and forth the first position and the second position. The first axis is perpendicular to the second axis.

In an embodiment of the present invention, the laser projector further includes a micro control unit (MCU), a digital signal processor (DSP) and a driving circuit. The micro control unit is configured to issue an instruction to the digital signal processor. The digital signal processor is configured to transmit a driving signal to the driving circuit according to the issued instruction. The driving circuit is configured to drive the scanning mirror to swing according to the driving signal.

In an embodiment of the present invention, the micro control unit is configured to determine whether the actual time interval between the first sensing signal and the second sensing signal conforms to the expected time interval.

In an embodiment of the present invention, the projection mirror has a projection region and a surrounding region. The surrounding region surrounds the projection region, and the photo sensor is located in the surrounding region.

To sum up, in the present invention, the photo sensor disposed on the projection mirror receives the laser beam sequentially at the first scanning time point and the second scanning time point so as to generate the first sensing signal and the second sensing signal, respectively. Under the situation where the laser beam of the laser projector performs scanning within the excepted scanning angle range, the actual time interval between the first sensing signal and the second sensing signal conforms to the expected time interval that is obtained by a previous estimation, and the power of the laser beam is normal and will not causing any damages to the user. Under the situation where the laser beam of the laser projector performs scanning without a sufficient scanning angle range, the laser beam performs the scanning for a shorter traveling distance. Thus, the actual time interval between the first sensing signal and the second sensing signal is smaller than the expected time interval, and the laser projector at this time may automatically stop emitting the laser beam so as to avoid an overly large amount of the laser energy gathered per unit projected area due to the laser beam of the laser projector performing scanning without a sufficient scanning angle range. Therefore, the risk of causing damages to the user can be avoided, and the safety of using the laser projector can be improved.

In order to make the aforementioned and other features and advantages of the present invention more comprehensible, several embodiments accompanied with figures are described in detail below.

BRIEF DESCRIPTION OF THE DRAWINGS

The accompanying drawings are included to provide a further understanding of the present invention, and are incorporated in and constitute a part of this specification. The drawings illustrate embodiments of the present invention and, together with the description, serve to explain the principles of the present invention.

DESCRIPTION OF EMBODIMENTS

Figure 1:
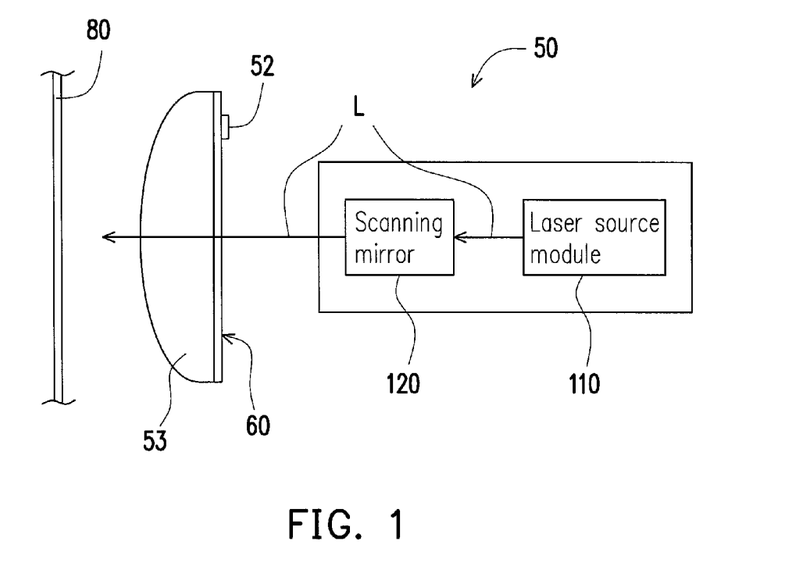
FIG. 1 is a schematic view illustrating a laser projector according to an embodiment of the present invention.
Figure 2:
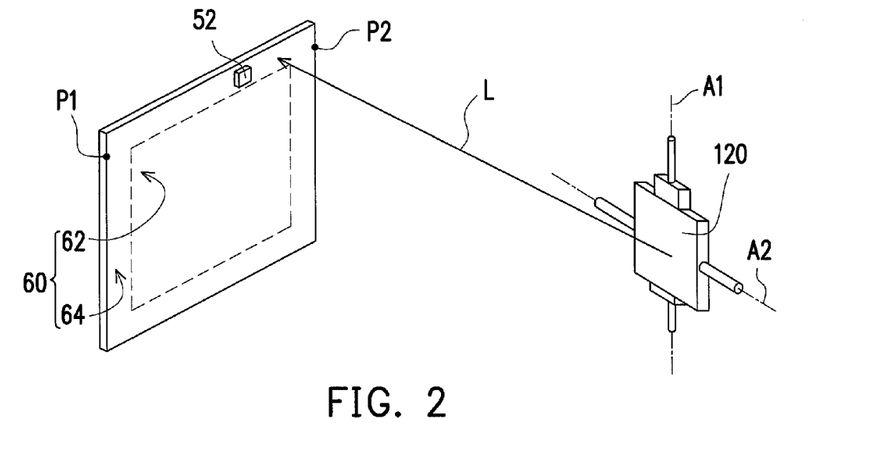
FIG. 2 is a perspective view showing a part of the elements of the laser projector depicted in FIG. 1.

FIG. 1 is a schematic view illustrating a laser projector according to an embodiment of the present invention. FIG. 2 is a perspective view showing a part of the elements of the laser projector depicted in FIG. 1. In order to be clear, only a projection mirror 60, a photo sensor 52 and a scanning mirror 120 of FIG. 1 are illustrated in FIG. 2. Referring to FIG. 1 and FIG. 2, a laser projector 50 of the present embodiment includes a photo sensor 52 and a projection lens 53. The photo sensor 52 is disposed on a projection mirror 60 of the projection lens 53 and located between a first position P1 and a second position P2 on the projection mirror 60. In the present embodiment, the first position P1 and the second position P2 are, for example, respectively located at two opposite edges of the projection mirror 60. However, in other embodiments, the first position P1 and the second position P2 may be located at other appropriate positions on the projection mirror 60.

The laser projector 50 further includes a laser source module 110 and a scanning mirror 120. The laser source module 110 is configured to emit a laser beam L to the scanning mirror 120. The laser beam L travels toward the projection mirror 60 through the scanning mirror 120 and passes through the projection lens 53 to project toward a projection surface 80 (e.g. a projection screen). The scanning mirror 120 is driven by, for example, a micro-electromechanical (MEMS) systems to swing with a first axis A1 or a second axis A2 as a center to change a scanning direction of the laser beam L, such that the laser beam L may be projected on areas on the projection mirror 60 and the projection surface 80 by scanning to form a projection image. Therein, the second axis A2 is perpendicular to the first axis A1. The detailed disposition and operation methods in connection with the laser source module 110, the scanning mirror 120 and any other MEMS laser scanning technology are well known in the related art and will not be repeated hereinafter.

In the present embodiment, the projection mirror 60 has a projection region 62 and a surrounding region 64, as shown in FIG. 2. The surrounding region 64 surrounds the projection region 62. The laser beam L passes through the projection region 62 to project an image. The photo sensor 52 is located in the surrounding region 64 to avoid the laser beam L being shielded in the projection region 62.

In the process of the laser projector 50 emitting the laser beam L and performing scanning on the projection mirror 60 by using the laser beam L in the projection mode, the laser beam L performs scanning back and forth between the first position P1 and the second position P2 and the photo sensor 52 disposed on the projection mirror 60 is capable of sensing the laser beam L so as to detect a scanning angle range of the laser beam L, which will be described in detail as follows.

Figure 3:
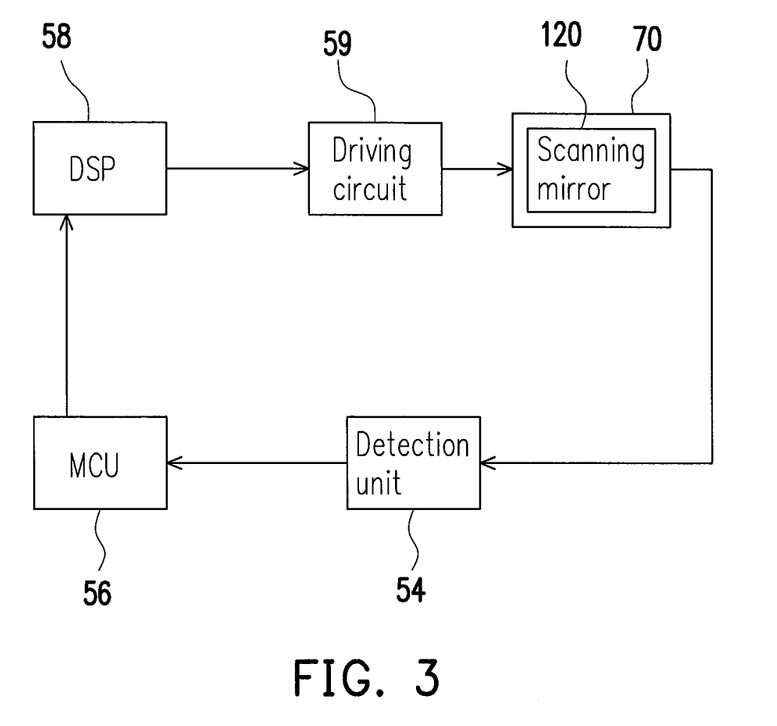
FIG. 3 is a block view showing a part of the elements of the laser projector depicted in FIG. 1.

FIG. 3 is a block view showing a part of the elements of the laser projector depicted in FIG. 1. Referring to FIG. 3, the laser projector 50 of the present embodiment further includes a detection unit 54, a micro control unit (MCU) 56, a digital signal processor (DSP) 58 and a driving circuit 59. The MCU 56 is configured to issue an instruction to the DSP 58. The DSP 58 is configured to transmit a driving signal to the driving circuit 59 according to the issued instruction, and the driving circuit 59 is configured to drive a micro-electromechanical (MEMS) system 70 according to the driving signal to drive the scanning mirror 120 to swing.

In the process of the laser beam L performing scanning back and forth between the first position P1 and the second position P2 as shown in FIG. 2, the photo sensor 52 receives the laser beam L sequentially at a first scanning time point and at a second scanning time point to generate a first sensing signal and a second sensing signal, respectively. The first scanning time point is a time point of the laser beam L passing through the photo sensor 52 during the process of moving from the first position P1 to the second position P2, for example, and the second scanning time point is a time point of the laser beam L again passing through the photo sensor 52 during the process of returning from the second position P2 to the first position P1.

Figure 4A:
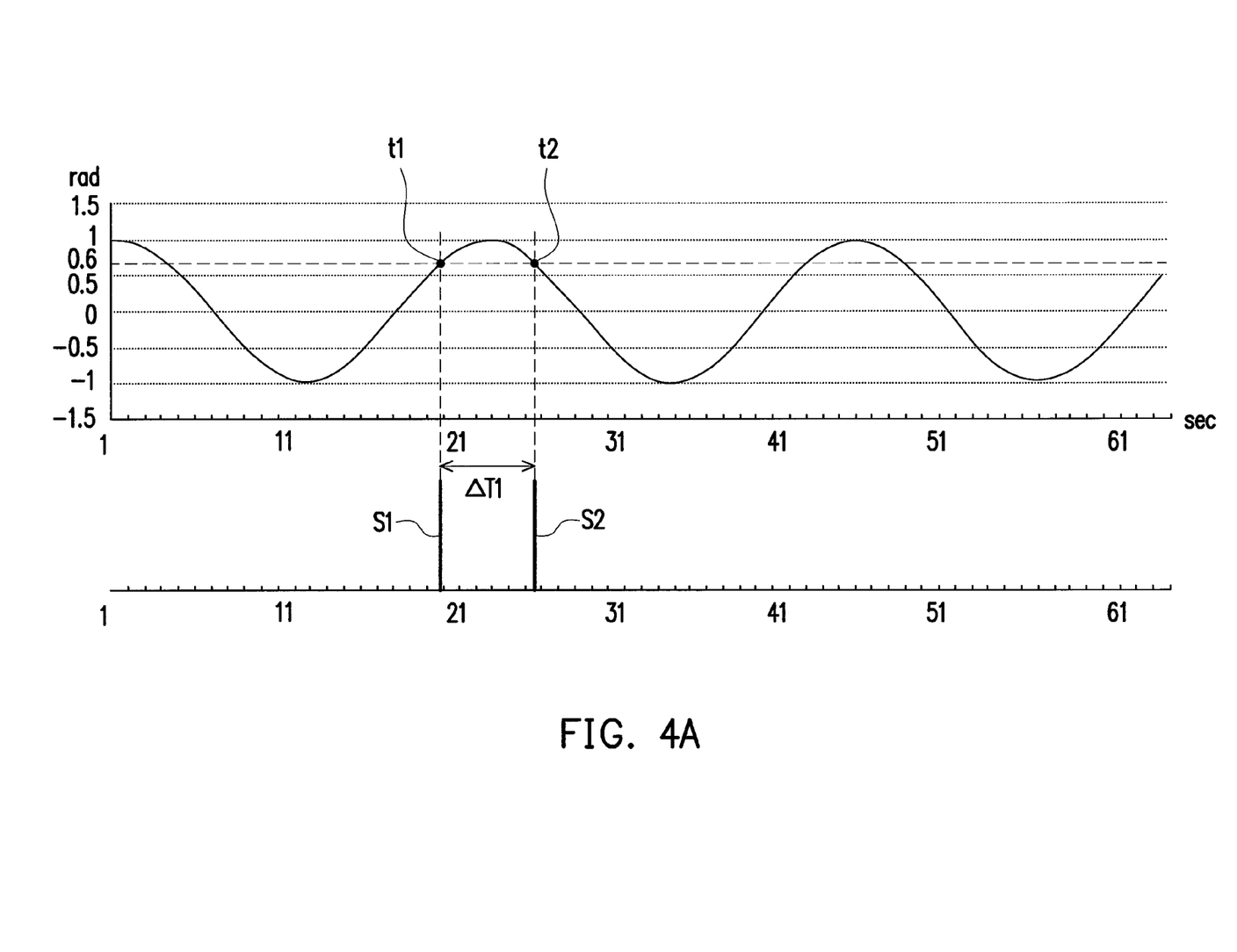
FIG. 4A and FIG. 4B are schematic views showing scanning angles of the scanning mirror depicted in FIG. 2, which vary with time.
Figure 5:
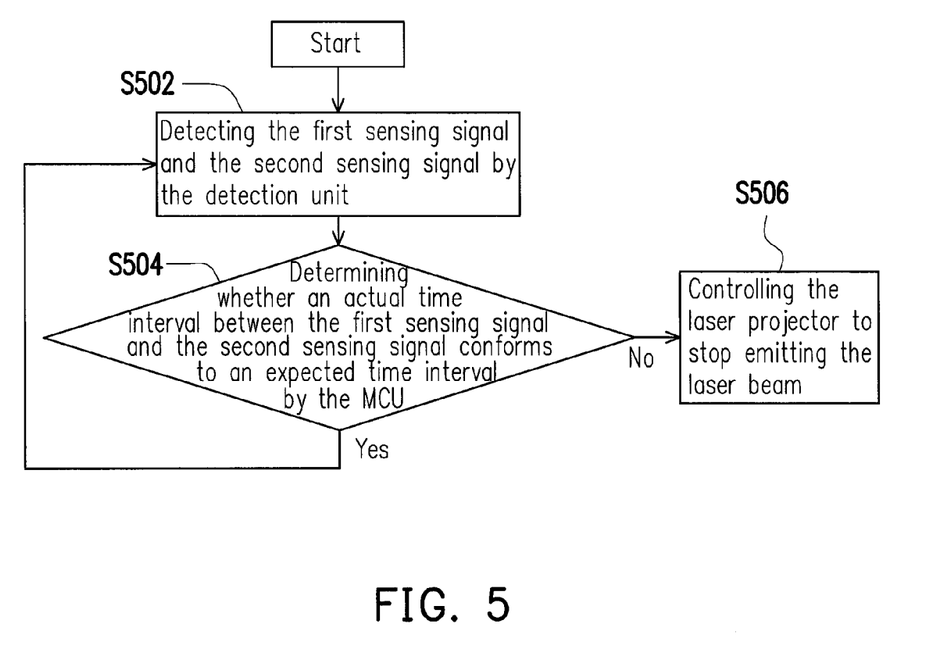
FIG. 5 is a flowchart of detecting a scanning angle range of the laser beam from the laser projector depicted in FIG. 1.

FIG. 4A and FIG. 4B are schematic views showing scanning angles of the scanning mirror depicted in FIG. 2, which vary with time. FIG. 5 is a flowchart of detecting a scanning angle range of the laser beam from the laser projector depicted in FIG. 1. Referring to FIG. 4A and FIG. 5, when the scanning angle range of the laser beam L is normal (for example, between +1 rad and −1 rad as shown in FIG. 4A) for laser energy gathered per unit projected area to have a normal value without causing damages to a user, the first scanning time point and the second scanning time point are respectively a time point t1 and a time point t2 (as shown in FIG. 4A). The photo sensor 52 receives the laser beam L sequentially at the time point t1 and at the time point t2 to generate a first sensing signal S1 and a second sensing signal S2 respectively, and the detection unit 54 (depicted in FIG. 3) detects the first sensing signal S1 and the second sensing signal S2, as shown in step S502 of FIG. 5. At this time, in step S504 of FIG. 5, the MCU 56 determines whether an actual time interval between the first sensing signal S1 and the second sensing signal S2 conforms to an expected time interval (i.e. ΔT1) and controls the laser projector 50 to continuously perform scanning, and the detection unit 54 continuously detects sensing signals generated during the process of the photo sensor 52 receiving the laser beam L so as to continue to determine whether the scanning angle range of the laser beam L is normal. The expected time interval ΔT1 varies with a size of the projected mirror 60 and may be estimated by measuring a size of the projection mirror 60.

Figure 4B:
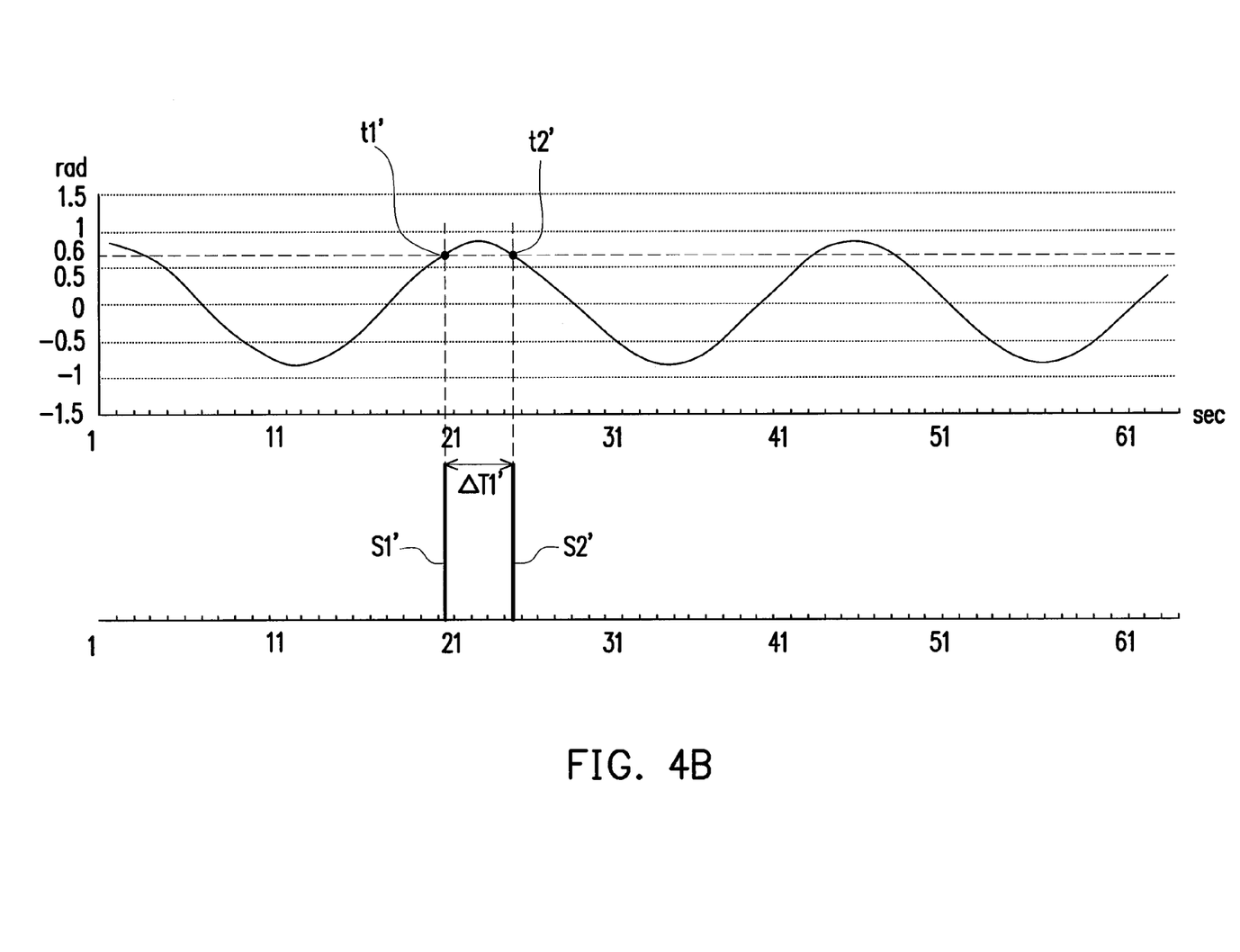

Referring to FIG. 4B and FIG. 5, when the scanning angle range of the laser beam L is insufficient (for example, between +0.8 rad and −0.8 rad, as shown in FIG. 4B) and becomes abnormal, the first scanning time point and the second scanning time point are respectively a time point t1' and a time point t2' (as shown in FIG. 4B). The photo sensor 52 receives the laser beam L sequentially at the time point t1' and the time point t2' to generate a sensing signal S1' and a sensing signal S2', respectively, and the detection unit 54 (depicted in FIG. 3) detects the first sensing signal S1' and the second sensing signal S2', as shown in step S502 of FIG. 5. At this time, in step S504 of FIG. 5, the MCU 56 determines that an actual time interval ΔT1' between the first sensing signal S1' and the second sensing signal S2' does not conform to the expected time interval (i.e. ΔT1) and in step S506 of FIG. 5, controls the laser projector 50 to stop emitting the laser beam L so as to avoid an overly large amount of the laser energy gathered per unit projected area due to the scanning angle range of the laser beam L of the laser projector 50 being insufficient. Accordingly, damages to the user are prevented and the safety of using the laser projector 50 is improved.

The expected time interval ΔT1 is, for example, a range value with a tolerable difference. If falling within the aforementioned range, the actual time interval between the first sensing signal and the second sensing signal is deemed as conforming to the expected time interval. The value of the tolerable difference may be changed as required, and the present invention is not intent to limit the value.

A method of detecting a scanning angle range of a laser projector according to the present invention will be described in detail by using the laser projector 50 depicted in FIG. 1 through FIG. 3 as an example.

Figure 6:
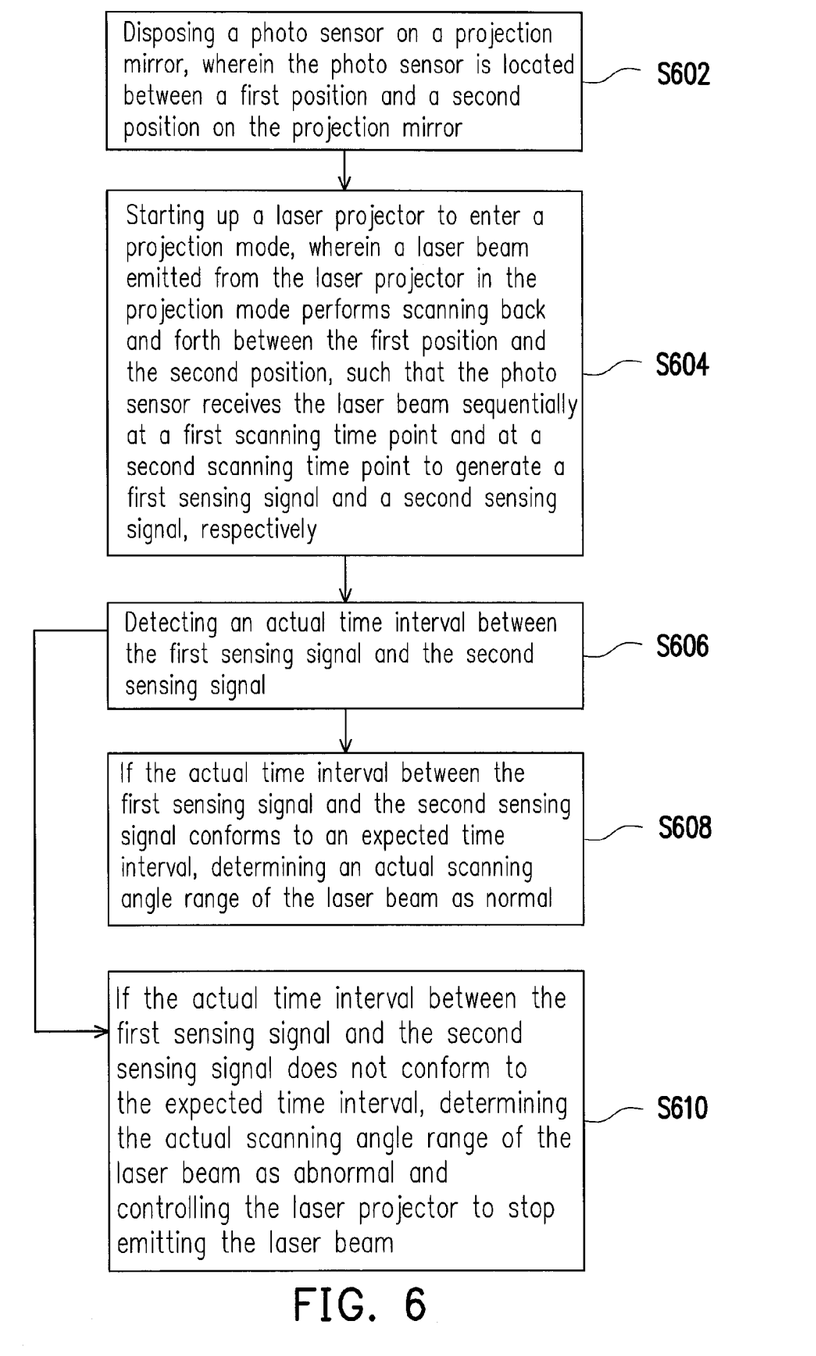
FIG. 6 is a flowchart illustrating a method of detecting a scanning angle range of a laser projector according to an embodiment of the present invention.

FIG. 6 is a flowchart illustrating a method of detecting a scanning angle range of a laser projector according to an embodiment of the present invention. Referring to FIG. 6 with FIG. 1 through FIG. 3, first, the photo sensor 52 is disposed on the projection mirror 60, and the photo sensor 52 is located between the first position P1 and the second position P2 on the projection mirror 60 (step S602). Then, the laser projector 50 is started up to enter the projection mode. The laser beam L emitted from the laser projector 50 in the projection mode performs scanning back and forth between the first position P1 and the second position P2, such that the photo sensor 52 receives the laser beam L sequentially at the first scanning time point and at the second scanning time point to generate the first sensing signal and the second sensing signal, respectively (step S604). The actual time interval between the first sensing signal and the second sensing signal is detected (step S606). If the actual time interval between the first sensing signal and the second sensing signal conforms to a range of the expected time interval, the actual scanning angle range of the laser beam L is determined as normal (step S608). If the actual time interval between the first sensing signal and the second sensing signal does not conform to the range of the expected time interval, the actual scanning angle range of the laser beam L is determined as abnormal and the laser projector 50 is controlled to stop emitting the laser beam L (step S610).

In aforementioned step S604, the step of the laser beam L emitted from the laser projector 50 performing scanning back and forth between first position P1 and the second position P2 is described as follows. The laser beam L is emitted from the laser source module 110 to the scanning mirror 120 and travels toward the projection mirror 60 through the scanning mirror 120. The scanning mirror 120 swings with the first axis A1 or the second axis A2 as the center to change the scanning direction of the laser beam L, such that the laser beam L performs scanning back and forth between the first position P1 and the second position P2.

The expected time interval varies with the size of the projected mirror 60. In the aforementioned process of the detecting method, the expected time interval may be estimated by measuring the size of the projection mirror 60. Additionally, in aforementioned step S610, the step of determining the actual scanning angle range of the laser beam L as abnormal is described as follows. If the actual time interval between the first sensing signal and the second sensing signal is smaller than the expected time interval, the actual scanning angle range of the laser beam L is determined as smaller than an expected scanning angle range, and the actual time interval between the first sensing signal and the second sensing signal is greater than the expected time interval, the actual scanning angle range of the laser beam L is determined as lager than the expected scanning angle range.

Before entering the projection mode, the laser projector 50 of the present embodiment may further perform searching for a maximum resonance point of driving signals in advance by the aforementioned function of detecting the scanning angle range, such that the laser projector 50 may perform projection by driving the scanning mirror 120 using a signal with the appropriate frequency, which will be described as follows.

Figure 7:
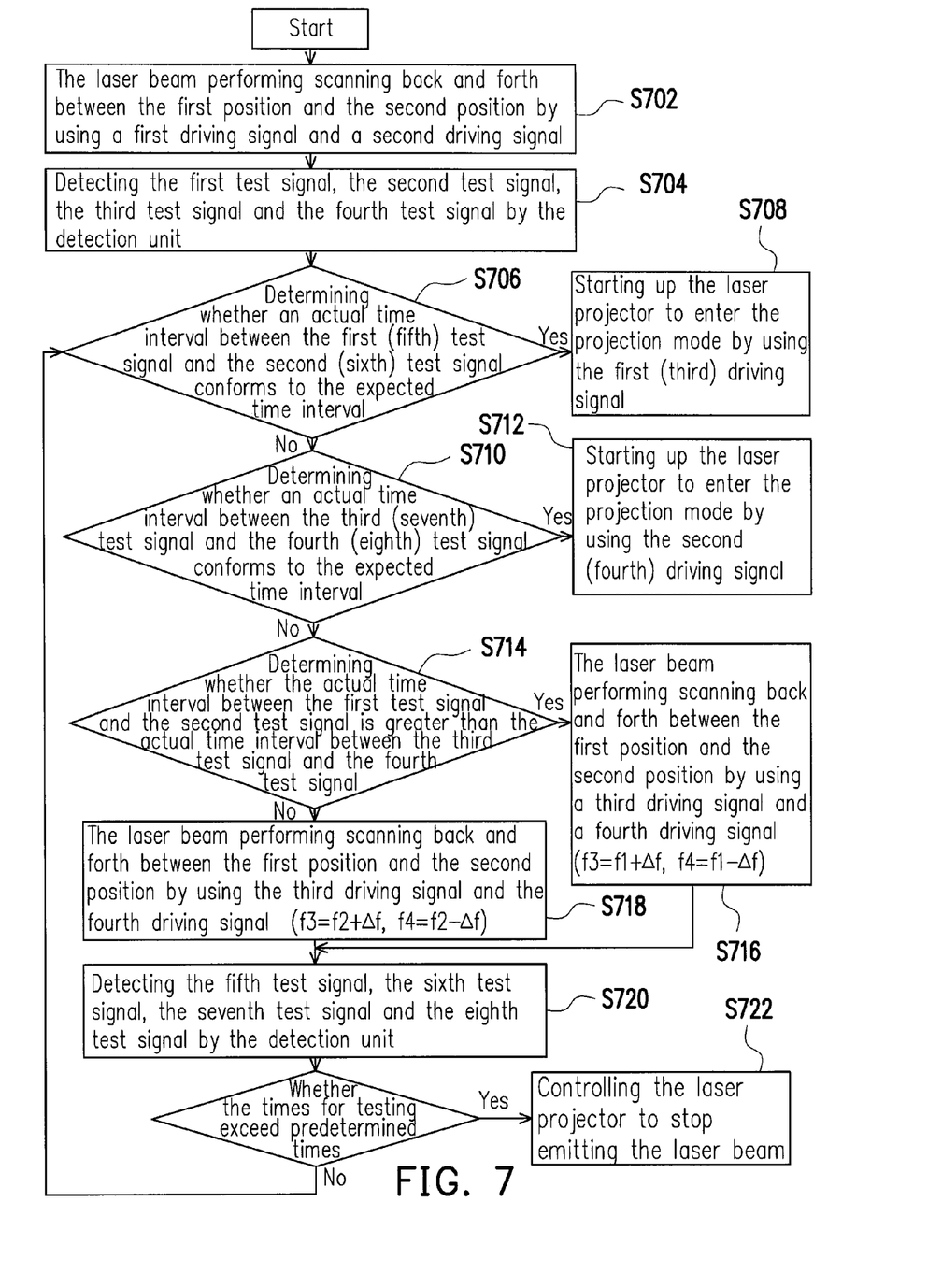
FIG. 7 is a flowchart of operating the laser projector depicted in FIG. 1 to enter a test mode.

FIG. 7 is a flowchart of operating the laser projector depicted in FIG. 1 to enter a test mode. Referring to FIG. 7 with FIG. 1 through FIG. 3, the laser projector 50 may be started up to enter a first test mode before the step of starting up the laser projector 50 to enter the projection mode, as shown in FIG. 7. In the first test mode, the laser beam L performs scanning back and forth between the first position P1 and the second position P2 by using a first driving signal (step S702), such that the photo sensor 52 receives the laser beam L sequentially at a first test time point and at a second test time point to generate a first test signal and a second test signal, respectively. Meanwhile, the laser beam L performs scanning back and forth between the first position P1 and the second position P2 by using a second driving signal (step S702), such that the photo sensor 52 receives the laser beam L sequentially at a third test time point and at a fourth test time point to generate a third test signal and a fourth test signal, respectively. Therein, the first driving signal has a first frequency f1, and the second driving signal has a second frequency f2. Then, the first test signal, the second test signal, the third test signal and the fourth test signal are detected by the detection unit 54 (step S704). If one of an actual time interval between the first test signal and the second test signal and an actual time interval between the third test signal and the fourth test signal conforms to the expected time interval (step S706 or S710), it represents that the first driving signal or the second driving signal is the driving signal with the appropriate frequency, and as such, the laser projector 50 may be started up to enter the projection mode by using the first driving signal or the second driving signal (step S708 or S712). The projection mode is the operation process as illustrated in FIG. 5.

The expected time interval, for example, is a range value with a tolerable difference. If the actual time interval between the first test signal and the second test signal or the actual time interval between the third test signal and the fourth test signal falls in the range value, it represents the actual time interval between the first test signal and the second test signal or the actual time interval between the third test signal and the fourth test signal is considered as conforming to the expected time interval. The value of the tolerable difference may be changed as required, and the present invention is not intent to limit the value of the tolerable difference.

Figure 8:
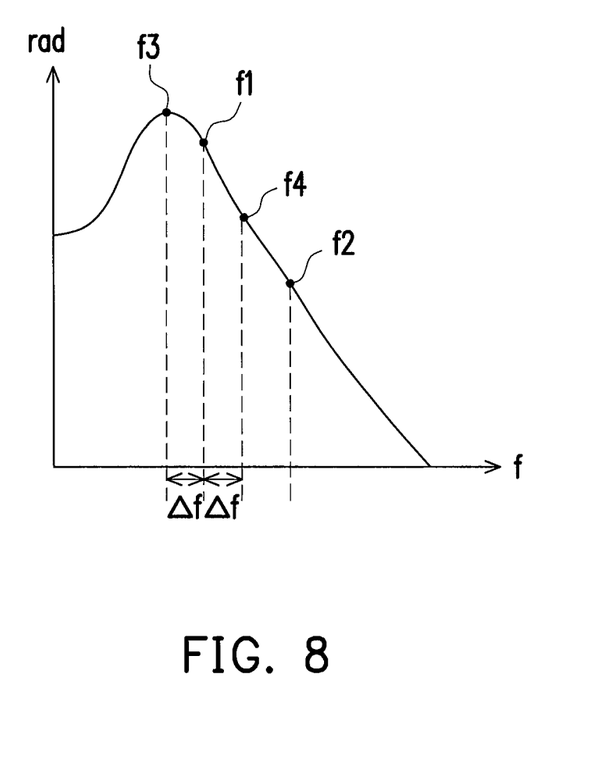
FIG. 8 is schematic view illustrating frequencies of the first driving signal and the second driving signal depicted in FIG. 7 which are less than an appropriate value.

FIG. 8 is schematic view illustrating frequencies of the first driving signal and the second driving signal depicted in FIG. 7 which are less than an appropriate value. In step S706 and step S710 of FIG. 7, if both the actual time interval between the first test signal and the second test signal and the actual time interval between the third test signal and the fourth test signal do not conform to the expected time interval, it represents that the first frequency f1 of the first driving signal and the second frequency f2 of the second driving signal do not meet the maximum resonance point, as shown in FIG. 8. At this time, step S714 is entered to determine whether the actual time interval between the first test signal and the second test signal is greater than the actual time interval between the third test signal and the fourth test signal.

If the actual time interval between the first test signal and the second test signal is determined as greater than the actual time interval between the third test signal and the fourth test signal, it represents that the first frequency f1 of the first driving signal is more close to the maximum resonance point (comparing with the second frequency f2 of the second driving signal), as shown in FIG. 8. At this time, the laser projector 50 is started up to enter a second test mode, and the laser beam L performs scanning back and forth between the first position P1 and the second position P2 by using a third driving signal (step S716), such that the photo sensor 52 receives the laser beam L sequentially at a fifth test time point and at a sixth test time point to generate a fifth test signal and a sixth test signal, respectively. In the meantime, the laser beam L performs scanning back and forth between the first position P1 and the second position P2 by using a fourth driving signal (step S716), such that the photo sensor 52 receives the laser beam L sequentially at a seventh test time point and an eighth test time point to generate a seventh test signal and an eighth test signal, respectively. Referring to FIG. 8, the third driving signal has a third frequency f3, and the fourth driving signal has a fourth frequency f4. The third frequency f3 equals to the first frequency f1 plus an increment Δf, and the fourth frequency f4 equals to the first frequency f1 minus a decrement Δf. Thus, the third frequency 13 of the third driving signal and the fourth frequency f4 of the fourth driving signal are more close to the maximum resonance point.

In step S714, if the actual time interval between the first test signal and the second test signal is determined as smaller than the actual time interval between the third test signal and the fourth test signal, it represents that the second frequency f2 of the second driving signal is more close to the maximum resonance point (comparing with the first frequency f1 of the first driving signal). At this time, step S718 is entered. Step S718 is similar to step S716; however, in step S718, the third frequency f3 in the second test mode is to be changed as equaling to the second frequency f2 plus an increment Δf, and the fourth frequency f4 is to be changed as equaling to the second frequency f2 minus a decrement Δf. Thus, the third frequency 13 of the third driving signal and the fourth frequency f4 of the fourth driving signal are more close to the maximum resonance point.

In step S720, the fifth test signal, the sixth test signal, the seventh test signal and the eighth test signal are detected by the detection unit 54. Then, step S706 and step S710 are returned to, and if one of the actual time interval between the fifth test signal and the sixth test signal and the actual time interval between the seventh test signal and the eighth test signal conforms to the expected time interval, it represents that the third frequency f3 of the third driving signal or the fourth frequency f4 of the fourth driving signal meets the maximum resonance point (FIG. 8 only illustrates that the third frequency f3 meets maximum resonance point). At this time, the laser projector 50 is started up to enter the projection mode by using the third driving signal or the fourth driving signal (step S708 or S712). The projection mode is the operation process as illustrated in FIG. 5. If the test process as above described is repeated for times exceeding predetermined times and no appropriate driving signal is found, the operation status of the laser projector 50 is determines as abnormal, and the laser projector 50 is controlled to stop emitting the laser beam L (step S722) after step S720 is performed.

Based on the above, in the present invention, the photo sensor disposed on the projection mirror receives the laser beam sequentially at the first scanning time point and the second scanning time point so as to generate the first sensing signal and the second sensing signal, respectively. Under the situation where the laser beam of the laser projector performs scanning within the excepted scanning angle range, the actual time interval between the first sensing signal and the second sensing signal may conform to the expected time interval that is obtained by a previous estimation, and the laser energy gathered per unit projection surface has a normal value without causing any damages to the user. Under the situation where the laser beam of the laser projector performs scanning without a sufficient scanning angle range, the laser beam performs the scanning for a shorter traveling distance. Thus, the actual time interval between the first sensing signal and the second sensing signal is smaller than the expected time interval, and the laser projector at this time may automatically stop emitting the laser beam so as to avoid an overly large amount of the laser energy gathered per unit projected area due to the laser beam of the laser projector performing scanning without a sufficient scanning angle range. Therefore, the risk of causing damages to the user can be avoided, and the safety of using the laser projector can be improved. Further, before entering the projection mode, the laser projector performs searching for the maximum resonance point of the driving signal by the aforementioned function of detecting the scanning angle range, such that the laser projector may drive the scanning mirror to perform projection by using the appropriate driving signal.

Although the invention has been described with reference to the above embodiments, it will be apparent to one of ordinary skill in the art that modifications to the described embodiment may be made without departing from the spirit of the invention. Accordingly, the scope of the invention will be defined by the attached claims not by the above detailed descriptions.

What is claimed is:

1. A method of detecting a scanning angle range of a laser beam of a laser projector, comprising:
    disposing a photo sensor on a projection mirror, wherein the photo sensor is located between a first position and a second position on the projection mirror;
    starting up a laser projector to enter a projection mode, wherein a laser beam emitted from the laser projector in the projection mode performs scanning back and forth between the first position and the second position, such that the photo sensor receives the laser beam sequentially at a first scanning time point and at a second scanning time point to generate a first sensing signal and a second sensing signal, respectively;
    detecting an actual time interval between the first sensing signal and the second sensing signal;
    if the actual time interval between the first sensing signal and the second sensing signal conforms to an expected time interval, determining an actual scanning angle range of the laser beam as normal; and
    if the actual time interval between the first sensing signal and the second sensing signal does not conform to the expected time interval, determining the actual scanning angle range of the laser beam as abnormal and controlling the laser projector to stop emitting the laser beam.

2. The method according to claim 1, wherein the laser projector comprises a laser source module and a scanning mirror, and the step of performing scanning back and forth between the first position and the second position by the laser beam emitted from the laser projector comprises:
    the laser source module emitting the laser beam to the scanning mirror, and the laser beam traveling toward the projection mirror through the scanning mirror; and
    the scanning mirror swinging with a first axis or a second axis as a center to change a scanning direction of the laser beam, such that the laser beam performs scanning back and forth between the first position and the second position, wherein the first axis is perpendicular to the second axis.

3. The method according to claim 1, further comprising:
    measuring a size of the projection mirror to estimate the expected time interval.

4. The method according to claim 1, wherein the step of determining the actual scanning angle range of the laser beam as abnormal comprises:
    if the actual time interval between the first sensing signal and the second sensing signal is smaller than the expected time interval, determining the actual scanning angle range of the laser beam as smaller than an expected scanning angle range; and if the actual time interval between the first sensing signal and the second sensing signal is greater than the expected time interval, determining the actual scanning angle range of the laser beam as greater than the expected scanning angle range.

5. The method according to claim 1, further comprising:
starting up the laser projector to enter a first test mode before starting up the laser projector to enter the projection mode, wherein the laser beam performs scanning back and forth between the first position and the second position by using a first driving signal in the first test mode, such that the photo sensor receives the laser beam sequentially at a first test time point and at a second test time point to generate a first test signal and a second test signal, respectively, and the laser beam performs scanning back and forth between the first position and the second position by using a second driving signal in the first test mode, such that the photo sensor receives the laser beam sequentially at a third test time point and at a fourth test time point to generate a third test signal and a fourth test signal, respectively, wherein the first driving signal has a first frequency, and the second driving signal has a second frequency;
detecting the first test signal, the second test signal, the third test signal and the fourth test signal; and
if either one of the actual time interval between the first test signal and the second test signal and the actual time interval between the third test signal and the fourth test signal conforms to the expected time interval, starting up the laser projector to enter the projection mode by using either the first driving signal or the second driving signal that conforms to the expected time interval.

6. The method according to claim 5, further comprising:
if both the actual time interval between the first test signal and the second test signal and the actual time interval between the third test signal and the fourth test signal do not conform to the expected time interval, and the actual time interval between the first test signal and the second test signal is greater than the actual time interval between the third test signal and the fourth test signal, starting up the laser projector to enter a second test mode,
wherein the laser beam performs scanning back and forth between the first position and the second position by using a third driving signal in the second test mode, such that the photo sensor receives the laser beam sequentially at a fifth test time point and at a sixth test time point to generate a fifth test signal and a sixth test signal, respectively, and the laser beam performs scanning back and forth between the first position and the second position by using a fourth driving signal in the second test mode, such that the photo sensor receives the laser beam sequentially at a seventh test time point and at an eighth test time point to generate a seventh test signal and an eighth test signal, respectively, wherein the third driving signal has a third frequency, the fourth driving signal has a fourth frequency, the third frequency equals to the first frequency plus an increment, and the fourth frequency equals to the first frequency minus a decrement;
detecting the fifth test signal, the sixth test signal, the seventh test signal and the eighth test signal; and if either one of the actual time interval between the fifth test signal and the sixth test signal and the actual time interval between the seventh test signal and the eighth test signal conforms to the expected time interval, starting up the laser projector to enter the projection mode by using either the third driving signal or the fourth driving signal that conforms to the expected time interval.

7. The method according to claim 1, wherein the expected time interval is a range value with a tolerable difference.

8. A laser projector, comprising:
a projection lens, having a projection mirror;
a photo sensor, disposed on the projection mirror and located between a first position and a second position on the projection mirror, wherein the laser projector emits a laser beam in a projection mode, the laser beam performs scanning back and forth between the first position and the second position, and the photo sensor receives the laser beam sequentially at a first scanning time point and a second scanning time point to generate a first sensing signal and a second sensing signal, respectively; and
a detection unit, configured to detect the first sensing signal and the second sensing signal, wherein when an actual time interval between the first sensing signal and the second sensing signal does not conform to an expected time interval, the laser projector stops emitting the laser beam.

9. The laser projector according to claim 8, further comprising:
a laser source module; and
a scanning mirror,
wherein the laser source module is configured to emit the laser beam to the scanning mirror, the laser beam travels toward the projection mirror through the scanning mirror, the scanning mirror swings with a first axis or a second axis as a center to change a scanning direction of the laser beam, such that the laser beam performs scanning back and forth between the first position and the second position, wherein the first axis is perpendicular to the second axis.

10. The laser projector according to claim 9, further comprising:
a micro control unit;
a digital signal processor; and
a driving circuit,
wherein the micro control unit is configured to issue an instruction to the digital signal processor, the digital signal processor is configured to transmit a driving signal to the driving circuit according to the issued instruction, and the driving circuit is configured to drive the scanning mirror to swing according to the driving signal.

11. The laser projector according to claim 10, wherein the micro control unit is configured to determine whether the actual time interval between the first sensing signal and the second sensing signal conforms to the expected time interval.

12. The laser projector according to claim 8, wherein the projection mirror has a projection region and a surrounding region, the surrounding region surrounds the projection region, and the photo sensor is located in the surrounding region.

* * * * *